Nov. 10, 1970 T. C. SYKES 3,538,567
WEDGE-LOCK FOR MACHINE TOOLS
Filed July 24, 1967 6 Sheets-Sheet 1
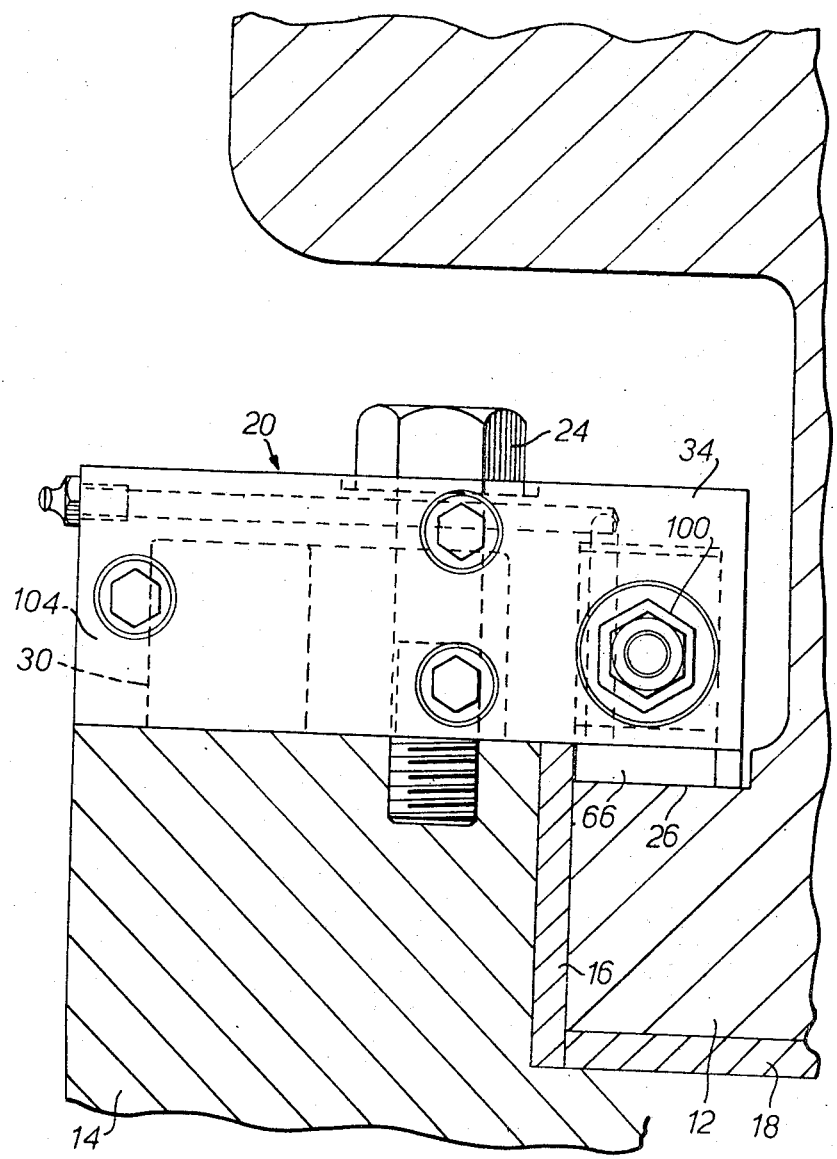
-FIG. 1A.-
INVENTOR:
THOMAS COLIN SYKES
BY
Norris & Bateman, Attys Nov. 10, 1970  T. C. SYKES  3,538,567
WEDGE-LOCK FOR MACHINE TOOLS
Filed July 24, 1967  6 Sheets-Sheet 3

INVENTOR:
THOMAS COLIN SYKES
BY
Norris + Bateman
Attys.

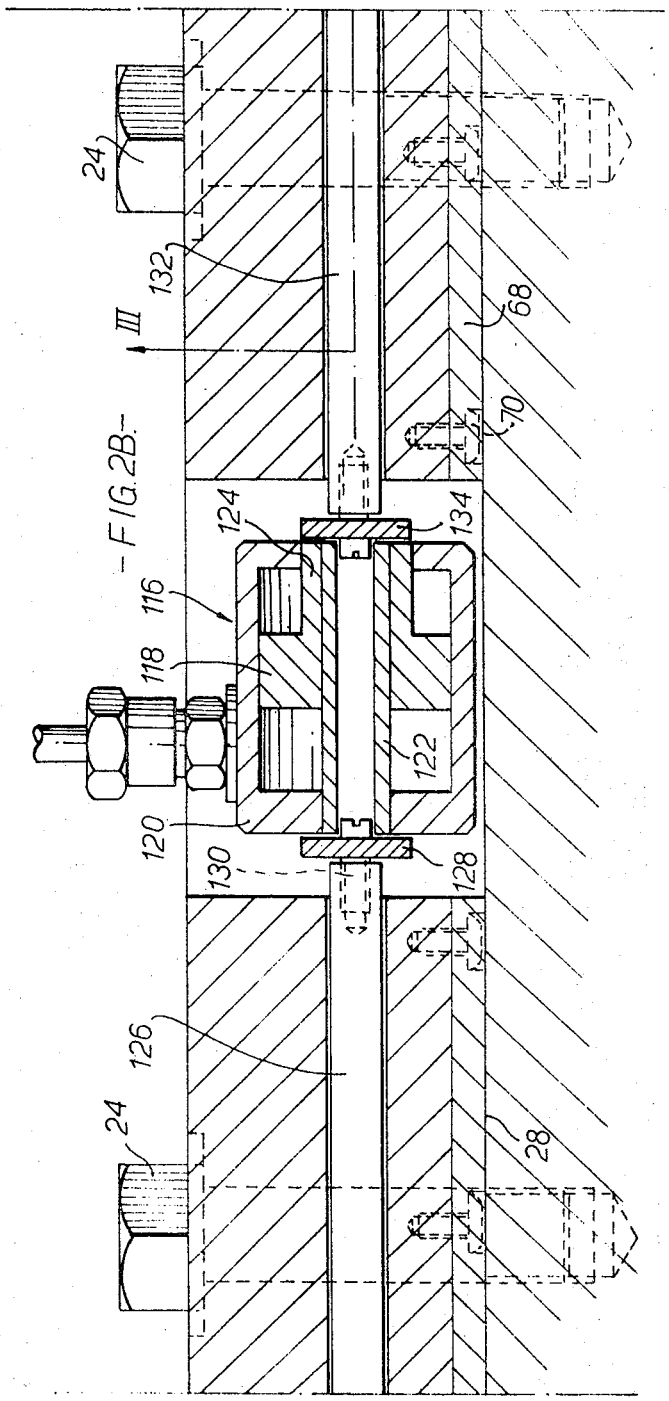

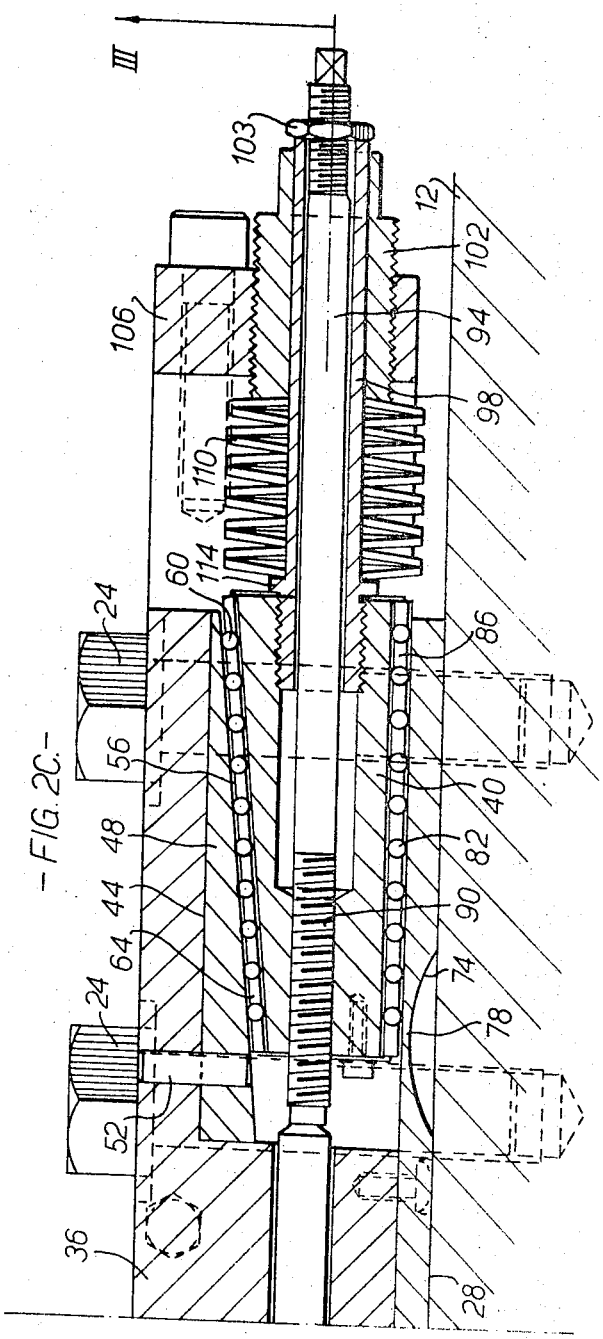

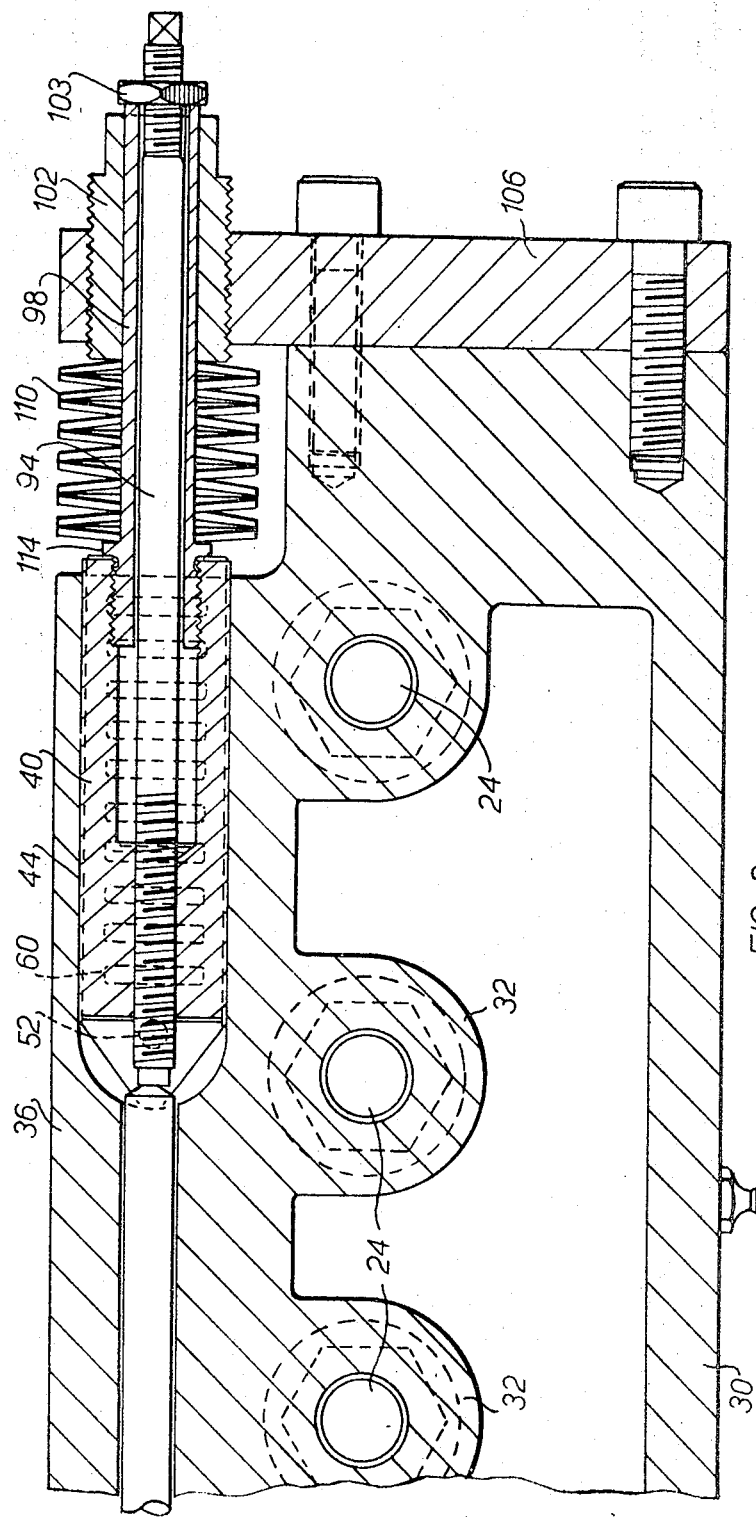

United States Patent Office 3,538,567
Patented Nov. 10, 1970

3,538,567
WEDGE-LOCK FOR MACHINE TOOLS
Thomas C. Sykes, Bradshaw, Halifax, York, England, assignor to William Asquith Limited, Halifax, York County, England, a corporation of Great Britain
Filed July 24, 1967, Ser. No. 655,396
Claims priority, application Great Britain, July 28, 1966, 33,852/66
Int. Cl. B21d 53/00
U.S. Cl. 29—1    6 Claims

ABSTRACT OF THE DISCLOSURE

A wedge lock for two relatively movable parts of a machine tool includes two wedges operating at opposite ends of one movable member. The wedges on their undersides engage locking members each mounted cantilever fashion so that they deflect into frictional locking engagement with one of the relatively movable members when the wedges are forced inwardly.

Figure 1B:
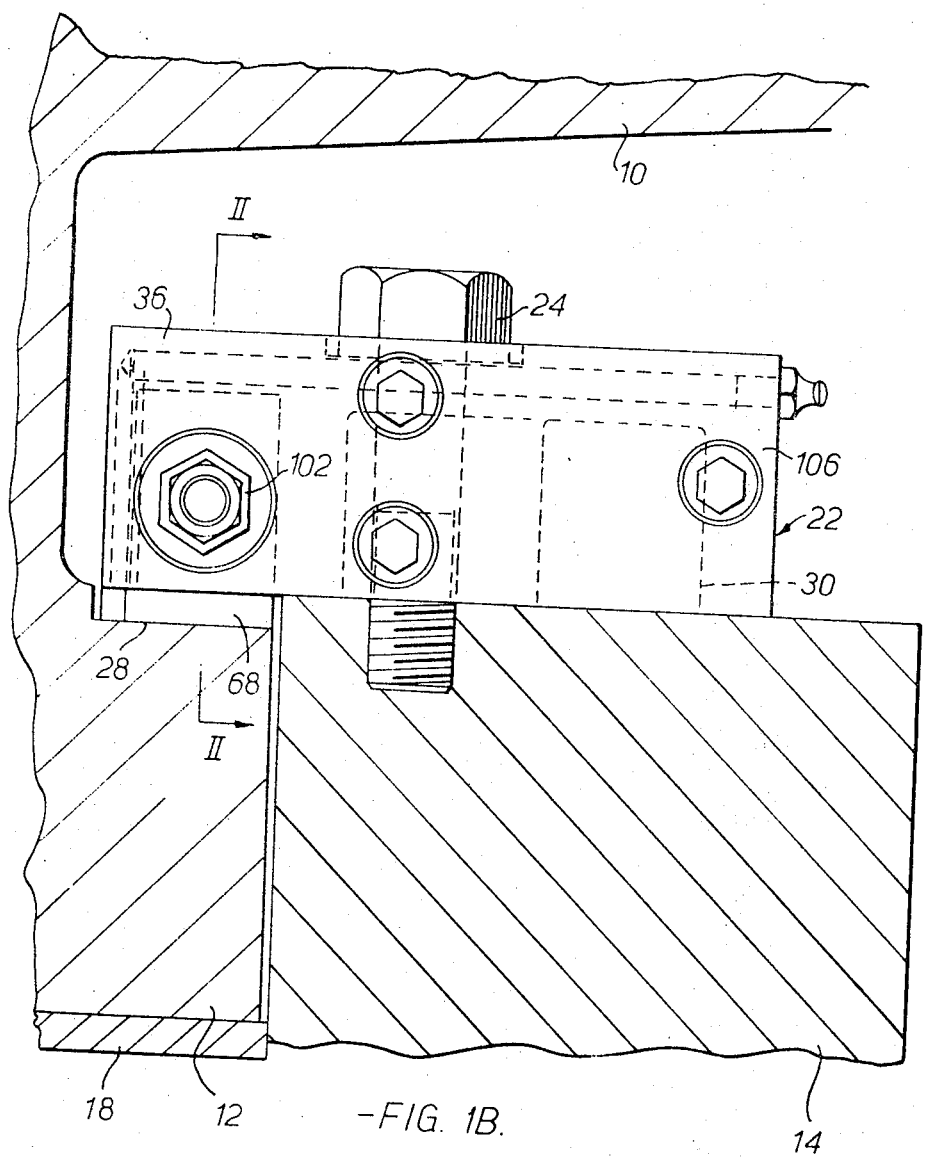

A hydraulic actuator and associated mechanism cooperates with opposed springs to automatically actuate the wedges in reverse directions so that locking and unlocking can be controlled remotely.

---

Wedges are frequently used for locking movable members to guideways on machine tools. Whilst the wedge provides an effective lock, it suffers from the disadvantage that it is difficult to loosen particularly if it has been subjected to repeated end thrust loads.

The object of the present invention is to provide a wedge-lock which is easier to free than known plain wedges. Although the invention is applicable to many situations on machine tools, it will be appreciated that it is very well adapted for use on automatically controlled machine tools, because it is important to avoid jamming on parts which have to be moved automatically. The invention also includes a machine tool having a wedge lock apparatus for a member movable along a slide.

According to this invention a wedge lock for locking together two relatively movable members in a machine tool comprises a wedge movable longitudinally into a space bounded by the two members and a locking member adapted to be deflected to transmit the wedging force from the wedge to one of the relatively movable members. Preferably the locking member is a cantilever fixed to one of the two members to be locked together and extending in its "overhung" portion between one face of the wedge and one face of one of the members to be locked together, whereby when the wedge is driven into its locking position, the "overhung" portion of the locking member is deflected due to the lateral thrust applied between the wedge and the locking member into frictional locking engagement with the member to which it is not fixed.

Preferably the locking member is reduced in thickness near to the position where its "overhung" portion joins its fixed portion to assist in the deflecting of the "overhung" portion. It is also preferred to make the locking member in hardened steel and to use it to provide a sliding surface on one of the two relatively movable members.

According to another feature of the invention needle rollers are fitted on the converging faces of the wedge, to act between the wedge and one of the relatively movable members at one side and between the wedge and the locking member at the other side.

According to yet another feature of the invention, a wedge-lock incorporates a resilient loading for the wedge and means for relieving the loading when the wedge is to be unlocked.

Wedge locking apparatus for the spindle head of a horizontal drilling machine will now be described, by way of example only, with reference to the accompanying drawings, in which:

FIG. 1A is a horizontal cross-section through the left hand side of a column and part of the spindle head of the machine, FIG. 1B is a horizontal cross-section through the right hand side of the column and part of the spindle head, FIG. 2A is the left hand side of a section on the line II—II in FIG. 1, FIG. 2B is the centre of a section on the line II—II in FIG. 1, FIG. 2C is the right hand side of a section on the line II—II in FIG. 1, and FIG. 3 is a section on the line III—III in FIGS. 2A, 2B and 2C.

Referring to FIG. 1, there is shown part of the vertical column 10 of a horizontal drilling machine, which is formed with a guide 12 on which there slides a cast iron drilling head 14, which carries the drill spindle and the necessary driving mechanism (not shown). Plain metal bearings 16 and 18 are provided on two faces of the head 14, but the head also has two sets of wedge locking apparatus 20 and 22 fastened to its rear faces by bolts 24, these wedge locks being adapted to cooperate with rear faces 26 and 28 on the guide 12.

The two sets of wedge locking apparatus 20 and 22 are identical, so that only one set will be described. Each set is double ended (see FIG. 2) and has a long hollow housing 30, which is formed with internal bosses 32 (FIG. 3) through which pass the bolts 24. The main hollow part of the housing 30 rests on the rear of the head 14, but two solid projecting parts 34 and 36 arranged one at each end of the housing extend over the rear face 28 of the guide 12.

Wedges 38 and 40 are provided one at each end of the housing 30, and it will be observed that these wedges face each other so that they have to move towards each other to exercise a locking effect on the drilling head 14.

If the wedges themselves contacted the surfaces 26 and 28, one of the wedges would tend to tighten and the other would tend to loosen whenever the head moved relative to the housing. Consequently, any alteration of the direction or the applied force between the head and housing would cause repeated tightening and slackening of each wedge, and this would give rise to the problem of wedge jamming.

However, in the present arrangement, each wedge 38, 40 enters a space 42, 44 in the part 34, 36 which is of constant rectangular cross-section throughout its length, the space being considerably larger in cross-section than the wedge. A hardened steel block 46, 48 is fixed to the part 34, 36 in the top of the space (by means of a dowel 50, 52), the block tapering so that its narrower end is at the outside, thereby providing a sloping top face 54, 56 corresponding to the slope of the top face of the wedge. A series of needle rollers 58, 60 in a cage 62, 64 is provided between the wedge and the fixed block 46, 48.

On the underside of the wedge there is a hardened steel locking member in the form of a plate 66, 68. One part of this plate extends beneath the part 34, 36 and is rigidly secured thereto by setscrews 70. The underside of this locking member 66, 68 runs on the surface 28 so that it acts as the bearing surface of the head 14 when the latter slides on the cast iron guideway 12. Part of the locking member 66, 68 projects cantilever fashion from the part 34, 36 under the wedge 38, 40, and where this "overhung" portion joins the fixed portion there is a transverse recess 72, 74 formed in the underside of the member. The recess is quite deep and the locking member has only a thin portion 76, 78 above the recess. A set of needle rollers 80, 82 in a cage 84, 86 is provided between the wedge 38, 40 and the top surface of the "overhung" portion of the locking member 66, 68.

The wedge itself is bored longitudinally and at its inner end its bore is screw threaded at 88, 90 to receive an externally screwed part of a pressure rod 92, 94 which extends through the wedge and projects a short distance on the inside of the wedge. A sleeve 96, 98 surrounds the length of the pressure rod outside the wedge, the rod being free to move within this sleeve, and at its inner end the sleeve is screwed into a screwed outer end of the bore of the wedge 38, 40. A small nut 101, 103 engages on a screwed outer end of the pressure rod 92, 94 to hold the sleeve in position on the rod. A pressure nut 100, 102 is slidable on the outside of the sleeve 96, 98, and has screwed engagement with a bracket 104, 106 bolted to the housing 30. A series of dished spring washers 108, 110 placed face-to-face is threaded on to the sleeve 96, 98 between a collar 112, 114 on the sleeve (which collar engages against the outside end of the wedge) and the pressure nut 100, 102. This information of dished washers provides, in effect, a powerful compression spring.

A recess in the centre of the housing 30 accommodates a small hydraulic actuator 116 of the piston and cylinder type, both the piston 118 and cylinder 120 being adapted to move in opposite directions when hydraulic fluid is admitted under pressure.

A hollow shaft 122 is fixed between the end walls of the cylinder 120, and the piston 118 has a boss 124 extending to one side, both the piston and its boss being adapted to slide on the shaft 122. The part 34 is bored longitudinally to receive a first release rod 126, which at its outer end engages with the inner end of the pressure rod 92. It has been found advantageous for the release rod to engage with its pressure rod above the axial centre line of the latter as illustrated in FIG. 2.

At its inner end the release rod 126 carriers an anvil disc 128 which is fixed by a screw 130 to the end of the rod. It is possible by adjusting the extent by which the pressure rods extend from the wedges 38, 40, to adjust the position of the anvil 128 relative to the cylinder 120, and in practice, the anvil is set with a small gap (say .010 inch) between itself and the end wall of the cylinder.

The part 36 is also bored to receive a second release rod 132, fitted with an anvil 134 in exactly the same manner as the first release rod. However, the anvil 134 is of such a size that it is adapted to be engaged by the boss 124 of the piston 118. The anvil is adjusted so that there is a small gap between it and the boss 124.

When the machine is assembled, the pressure nuts 100, 102 at each end are tightened. There is some compression of the dished washers 108, 110, but most of the displacement applied by the pressure nuts is used to apply longitudinal inward movement to the wedges 38 and 40. The gaps between the anvils and the housing 120 or boss 124 as the case may be ensure that the spring pressure is not opposed by the hydraulic fluid in the cylinder 120. Each wedge presses on its roller bearings and the resultant force on the "overhung" portion of the locking member 66, 68 causes that portion to bend laterally (the bend being quite suddent at the recessed portion 76, 78) into engagement with the guideway 28. This produces the wedge-lock effect.

When the wedge is to be released, hydraulic fluid under pressure is applied to the actuator 116. The anvils 128 and 134 are then engaged respectively by the cylinder 120 and the boss 124 and the release rods 126, 132 then press the pressure rods 92, 94 outwardly, and these cause the wedges 38, 40 to move outwardly. This movement compresses the dished washers 108, 110 but it also releases the bending load on the locking members 66, 68, which straighten out, releasing the lock between the head 14 and its guideway 12. As soon as the hydraulic pressure is released, the spring washers 108, 110 expand and force the wedges back into the locking position. The look can therefore be operated remotely by the control of the hydraulic fluid supply to the cylinder.

Thus it will be seen that by virtue of the fact that the wedges are not in direct sliding contact with the faces 26 and 28 of the guide 12, there is a reduced tendency for the wedges to tighten or loosen when the head is moved axially of the housing. The locking force applied by the wedges is quite independent of the frictional forces between the mating surfaces.

I claim:

1. A wedge lock for locking together two relatively movable members in a machne tool comprising a wadge mounted to be movable longitudinally into a space between said two relatively movable members, and a locking member comprising a cantilever of substantially uniform thickness throughout its length and having a fixed portion rigid with one of said relatively movable members and a deflectable "over-hung" portion extending between one side of said wedge and a face on the other of said two relatively movable members, said cantilever having a transverse recess of substantial depth to provide a thin flexible portion at the location at which said "over-hung" portion joins said fixed portion, spring means for resiliently loading said wedge toward a locking position, whereby when said wedge is moved toward its locking position, the "over-hung" portion of said locking member is readily deflected by lateral thrust from said wedge into frictional locking engagement with said other relatively movable member, and release means for overcoming said spring means and moving said wedge to an unlocked position.

2. A wedge lock according to claim 1, in which said locking member is made of hardened steel and provides a sliding surface engagement with said one of said two relatively movable members.

3. A wedge lock as claimed in claimed 1 in which needle rollers are fitted on the converging faces of the wedge, to act between the wedge and one of the relatively movable members at one side and between the wedge and the locking member at the other side.

4. A wedge lock as claimed in claim 1, in which the spring means comprises a series of dished washers arranged in face-to-face pairs.

5. Apparatus for locking together two relatively movable members in a machine tool comprising two opposed wedge locks each in accordance with claim 1.

6. A wedge lock as defined in claim 1, said release means including a power operated mechanism having a power member, a release rod for transmitting a releasing load from said power member to said wedge, said release rod normally being spaced from said member to provide a clearance therebetween when said wedge is in the locked position.

References Cited

UNITED STATES PATENTS 3,192,600 7/1965 Jones _____ 29—1
3,106,110 10/1963 Seun _____ 29—1

JOHN F. CAMPBELL, Primary Examiner

R. J. CRAIG, Assistant Examiner

U.S. Cl. X.R.

77—4